US006670798B1

(12) United States Patent
Lorello et al.

(10) Patent No.: US 6,670,798 B1
(45) Date of Patent: Dec. 30, 2003

(54) AUTO POWER-ON, HOT-PLUGGABLE USER INTERFACE CONTROLLER FOR MAILING MACHINES

(75) Inventors: Michael J. Lorello, Branford, CT (US); George J. Doutney, Sandy Hook, CT (US); Edward R. Bass, Trumbull, CT (US); Young W. Lee, Orange, CT (US); Maria P. Parkos, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/256,045

(22) Filed: Sep. 25, 2002

(51) Int. Cl.[7] .............................................. G05B 24/02
(52) U.S. Cl. ...................................................... 323/318
(58) Field of Search ................................. 323/234, 266, 323/268, 270, 273, 275, 318, 349, 350, 352

(56) References Cited

U.S. PATENT DOCUMENTS 4,642,791 A * 2/1987 Mallozzi et al. ............... 710/71
6,606,226 B2 * 8/2003 Bass et al. ..................... 361/42

* cited by examiner

Primary Examiner—Matthew V. Nguyen
(74) Attorney, Agent, or Firm—Brian A. Lemm; Angelo N. Chaclas; Charles R. Malandra, Jr.

(57) ABSTRACT

A mailing machine base includes a docking system for a User Interface Controller (UIC) that provides a feedback signal to the mailing machine based on the presence of the UIC. When the UIC is inserted into a docking connector of the mailing machine, the mailing machine detects the presence of the UIC. A delay circuit within the mailing machine provides a signal to a power control circuit after a predetermined time delay. The power control circuit, based on the signal from the delay circuit, will provide power to the UIC only after the UIC has been securely docked for the full predetermined time delay. When the UIC is removed from the mailing machine, the mailing machine, based on the feedback signal, will quickly remove the power provided to the docking connector. Thus, the mailing machine can remain powered during removal and replacement of the UIC.

31 Claims, 2 Drawing Sheets

AUTO POWER-ON, HOT-PLUGGABLE USER INTERFACE CONTROLLER FOR MAILING MACHINES

FIELD OF THE INVENTION

The invention disclosed herein relates generally to mailing machines, and more particularly to a mailing machine having a user interface controller that can be easily removed or installed without powering down the entire mailing machine.

BACKGROUND OF THE INVENTION

Mailing machines often include different modules that automate the processes of producing mail pieces. The typical mailing machine includes a variety of different modules or sub-systems each of which performs a different task on the mail piece. The mail piece is conveyed downstream utilizing a transport mechanism, such as rollers or a belt, to each of the modules. Such modules could include, for example, a singulating module, i.e., separating a stack of mail pieces such that the mail pieces are conveyed one at a time along the transport path, a moistening/sealing module, i.e., wetting and closing the glued flap of an envelope, a weighing module, and a metering module, i.e., applying evidence of postage to the mail piece. The exact configuration of the mailing machine is, of course, particular to the needs of the user.

A control panel device, hereinafter referred to as a User Interface Controller (UIC), performs user interface and controller functions for the mailing machine. Specifically, the UIC provides all user interfaces, executes control of the mailing machine and print operations, calculates postage for debit based upon rate tables, provides the conduit for the Postal Security Device (PSD) to transfer postage indicia to the printer, operates with peripherals for accounting, printing and weighing, and conducts communications with a data center for postage funds refill, software download, rates download, and market-oriented data capture. The UIC, in conjunction with an embedded PSD, provides the system meter that satisfies U.S. and international postal regulations regarding closed system information-based indicia postage (IBIP) meters.

Since the UIC stores postage value, i.e., monetary value, therein, a user may wish to secure the UIC during times that the UIC will not be used, such as, for example, during lunch or overnight, to prevent unauthorized use of the postage value stored therein. Accordingly, it is desirable for a user to be able to remove the UIC from the mailing machine for secure storage, such as, for example, in a locked cabinet or office, for any time periods during which use of the mailing machine and UIC are not authorized. By removing and securing the UIC, the postage value stored therein will also be secure. When use of the mailing machine and UIC is authorized, the UIC can be replaced on the mailing machine.

There are problems, however, with the such removal and replacement of the UIC by the user. When the UIC is being installed in a mailing machine, it is preferable that power be applied to the mailing machine after the UIC has been installed, i.e., the mailing machine must be off and then "powered up" after the UIC is installed. Applying the power after the UIC has been installed will help protect the electronic circuitry and the contacts of the UIC and mailing machine from damage. The powering up and powering down of the entire mailing machine, however, can take a significant amount of time, especially if the mailing machine performs any type of initialization, diagnostic or other necessary operations each time the machine is turned on or off. Many users, therefore, would not wait for the mailing machine to power down, install the UIC and then re-apply power to the mailing machine, but instead would install the UIC with the mailing machine powered up, thereby risking damage to the UIC and mailing machine.

Thus, there exists a need for a method and system that allows removal and replacement of a UIC from a mailing machine without having to power down the entire mailing machine.

SUMMARY OF THE INVENTION

The present invention alleviates the problems associated with the prior art and provides a method and system that allows removal and replacement of a UIC from a mailing machine without having to power down the entire mailing machine.

In accordance with the present invention, a mailing machine includes a docking system for the UIC that provides a feedback signal to the mailing machine based on the presence of the UIC. When the UIC is inserted into the docking connector of the mailing machine, the mailing machine detects the presence of the UIC based on the feedback signal. A delay circuit within the mailing machine provides a signal to a power control circuit after a predetermined time delay. The power control circuit, based on the signal from the delay circuit, will provide power to the UIC. If the UIC is jostled within the docking connector during insertion, causing multiple quick make-break cycles of the docking connector, the delay timer will be reset, thus ensuring that power is provided to the UIC only after the UIC has been securely docked for the full predetermined time delay. When the UIC is removed from the mailing machine, i.e., undocked from the docking connector, the mailing machine, based on the feedback signal, will quickly remove the power provided to the docking connector. Thus, according to the present invention, the mailing machine can remain powered during removal and replacement of the UIC.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
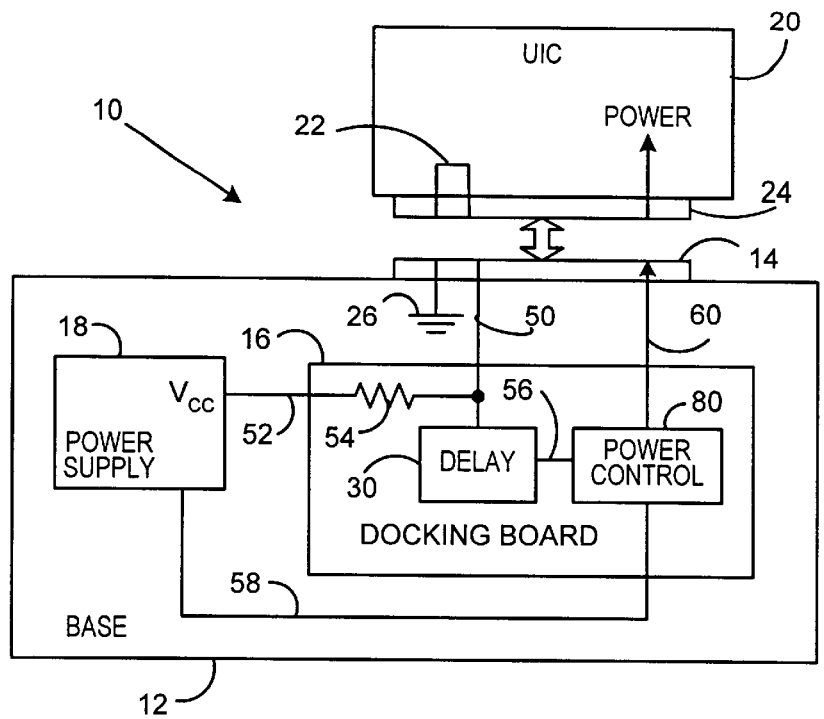
FIG. 1 illustrates in block diagram form a mailing machine having a UIC docking system according to the present invention.

In describing the present invention, reference is made to the drawings, wherein there is seen in FIG. 1 in block diagram form a system 10 that includes a docking system according to the present invention. System 10 includes mailing machine base 12. A docking connector 14 is secured to the mailing machine base 12, and serves as the primary interface between a User Interface Controller (UIC) 20 and the mailing machine base 12. UIC 20, among other things, provides all user interfaces, executes control of at least the print operations of mailing machine base 12 and conducts communications with a data center for postage funds refill, software download, rates download, and market-oriented data capture. UIC 20 includes a connector 24 that corresponds to connector 14 on base 12. Connector 24 is provided with a jumper 22 between two pins for use as described below. Docking connector 14 protrudes from mailing machine base 12 in an area that accommodates the UIC 20. The mating of connectors 14, 24 provides the electrical connections between the UIC 20 and mailing machine base 12. Thus, UIC 20 can be inserted and removed from system 10 without having to connect or disconnect any cables.

Base 12 includes a docking board 16 coupled to the docking connector 14. Docking board 16 is preferably secured internal to the enclosure of the mailing machine 12. Docking board 16 includes a delay circuit 30 and a power control circuit 80, as further described below. A power supply 18 provides power, typically in the range of 5 Volts, to the base 12. Power for the UIC 20 is also provided from the mailing machine base 12, via the docking board 16, as described below.

The operation of system 10 according to the present invention is as follows. When UIC 20 is not docked on the mailing machine base 12, i.e., connector 24 of UIC 20 is not coupled to connector 14 of base 12, the signal line 50 is pulled to a logic high level of $V_{cc}$, e.g., 5 volts, by power supply 18 via signal line 52 and resistor 54. The high input to delay 30 conducted by signal line 50 causes delay 30 to output a first signal to power control circuit 80, via signal line 56, that causes the power control circuit 80 to maintain an off state. When power control circuit 80 is in an off state, power from a power supply in the mailing machine base, such as, for example, power supply 18 via line 58, is not passed through the power control circuit 80 to connector 14. Thus, when UIC 20 is not properly docked on the mailing machine base 12 there is no power provided to connector 14.

When UIC 20 is docked on the mailing machine base 12, i.e., connectors 24 and 14 are mated together, the logic level on signal line 50 is pulled to a logic low level, i.e., 0 volts, by the jumper 22 of connector 24 coupling the signal line 50 to a ground terminal 26 in the mailing machine base 12. The low input to delay 30 conducted by signal line 50 causes delay 30 to activate and after a predetermined delay time the output from delay 30 to power control circuit 80, via line 56, will transition states from the first signal to a second signal. If the UIC 20 is jostled during the docking procedure, causing multiple quick make-break cycles of the connectors 14, 24, the delay 30 will be reset. Thus, not until the UIC 20 has been securely docked with the mailing machine base 12 for the full predetermined time delay will the output from delay 30 transition. Power control circuit 80, in response to the transition of the signal from delay 30 from the first to the second state, will activate, thereby allowing the power from power supply 18, via line 58, to pass through the power control circuit 80 to signal line 60 and into the UIC 20 via connectors 14 and 24. Thus, when the UIC 20 is properly docked on the mailing machine base 12, the UIC 20 will, after a short delay, automatically be powered up.

Since the power is supplied to the UIC 20 only after the UIC 20 has been securely docked, the UIC 20 is now hot-pluggable to the mailing machine base 12, i.e., the mailing machine base 12 can remain powered up during the docking of the UIC 20. The delay in providing power to the UIC 20 will ensure the connectors 14, 24 are securely coupled, thereby providing protection to the connectors 14, 24 from any high in-rush currents that may be present if the UIC 20 were docked to the mailing machine base 12 when power was present on connector 14. Such high inrush currents could be caused, for example by the bulk capacitance from the UIC 20 during charging of the capacitors in the UIC 20. Thus, if connector 14 has power when the UIC 20 is docked, the high in-rush currents could cause damage to the connectors 14, 24 if they are not securely coupled when the current passes through them. For example, if the connectors 14, 24 are not securely coupled when the in-rush currents are present, there could be arcing between connectors 14 and 24. Such arcing could degrade the operational characteristics of the connectors 14, 24, and could eventually lead to failure of a portion of one or both of the connectors 14, 24, as well as damage to the UIC 20. The delay in application of power to connector 14 according to the present invention, thereby ensuring that connectors 14, 24 are securely coupled, will prevent any arcing from occurring, thereby extending the operating life of the connectors 14, 24 and preventing any damage to the UIC 20.

When UIC 20 is removed from the mailing machine base 12, the signal line 50 is again pulled to a logic high level, i.e., 5 volts, by power supply 18 via signal line 52 and resistor 54. The high input to delay 30 conducted by signal line 50 causes the output of delay 30 on signal line 56 to transition back to the first state, thereby causing the power control circuit 80 to return to an off state. Accordingly, power will no longer be provided to connector 14. If the UIC 20 is immediately replaced on the mailing machine base 12, the power to the connector 14 will again be provided to connector 14 once the UIC 20 is properly docked and after the delay as previously described. Thus, the UIC 20 can be removed and replaced from the mailing machine base 12 without having to power down the mailing machine base 12.

Figure 2:
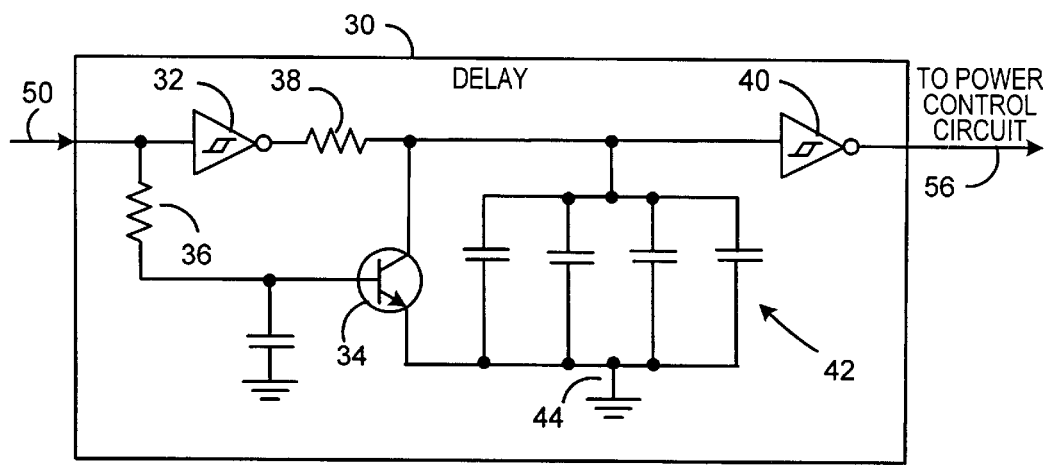
FIG. 2 illustrates in schematic diagram form a delay circuit for the docking system according to an embodiment of the present invention.

Referring now to FIG. 2, there is illustrated in schematic diagram form a delay 30 according to an embodiment of the present invention. Delay 30 includes a first inverter 32, preferably a Schmitt inverter, having an input coupled to signal line 50 from connector 14. The use of a Schmitt inverter ensures a very clean on/off transition. Signal line 50 is also coupled to a first terminal of a transistor 34 through a resistor 36. A second terminal of transistor 36 is coupled to the output of inverter 32, via resistor 38, and the input of a second inverter 40, also preferably a Schmitt inverter. A third terminal of transistor 34 is coupled to a ground node 44. A bank of capacitors 42 is coupled between the input of inverter 40 and the ground node 44. While four capacitors are included in capacitor bank 42 as illustrated in FIG. 2, it should be understood that any number of capacitors can be utilized depending upon the delay time desired as described below. The output of inverter 40 is coupled to the output line 56 of delay 30.

The operation of delay 30 is as follows. When UIC 20 is not docked on the mailing machine base 12, i.e., connector 24 of UIC 20 is not coupled to connector 14 of base 12, the signal line 50 is pulled to a logic high level of $V_{cc}$, e.g., 5 volts, by power supply 18 via signal line 52 and resistor 54. The logic high signal on line 50 will be inverted by inverter 32. Additionally, the logic high signal on line 50 will cause transistor 34 to turn on, thereby coupling the output of inverter 32 to ground node 44 through the transistor 34. Thus, a logic low signal will be input to inverter 40, which will cause a logic high signal to be output on line 56 from the delay 30.

When UIC 20 is docked on the mailing machine base 12, i.e., connectors 24 and 14 are mated together, the logic level on signal line 50 is pulled to a logic low level, i.e., 0 volts, by the jumper 22 of connector 24 coupling the signal line 50 to a ground terminal 26 in the mailing machine base 12. The low logic signal on line 50 will be inverted by inverter 32. Additionally, the logic low signal on line 50 will cause transistor 34 to turn off, thereby coupling the output of inverter 32 to ground node 44 through the capacitor bank 42. The output from inverter 32 will transition from a low to a high logic signal level, i.e., from 0 volts to 5 volts. As the output from inverter 32 transitions from low to high, the capacitors in capacitor bank 42 will begin to charge. The charging of capacitor bank 42 will cause the voltage level being input to inverter 40 to slowly rise from 0 volts to 5 volts. Accordingly, only after the threshold input voltage, i.e., approximately 2 to 2.5 volts, is exceeded for inverter 40 will the output from inverter 40, and hence the output of the delay 30 on line 56, transition from a high logic level to a low logic level. Thus, the delay time for the transition of the output of delay 30 is based on the number and value of the capacitors in the capacitor bank 42, and can be set for a predetermined time delay as desired. Preferably, the delay period for the capacitor bank 42 to charge is approximately 50 msec.

Transistor 34 also serves to reset the delay period if the UIC 20 is jostled during the docking procedure, causing multiple quick make-break cycles of the connectors 14, 24. Each time the connection between connectors 14, 24 is broken, the signal line 50 is pulled to a logic high level as previously described. The logic high signal on line 50 will cause transistor 34 to turn on, thereby coupling both terminals of the capacitor bank to ground node 44, causing the capacitor bank 42 to discharge. When the connection between connectors 14, 24 is again established, the capacitor bank 42 will have to completely recharge, thus delaying the transition of the input voltage to inverter 40. As noted above, only after the threshold input voltage is exceeded for inverter 40 will the output from inverter 40, and hence the output of the delay 30 on line 56, transition from a high logic level to a low logic level. Thus, the delay period will be reset each time the connection between connectors 14, 24 is broken.

When UIC 20 is removed from the mailing machine base 12, the signal line 50 is pulled to a logic high level. The logic high signal on line 50 will be inverted by inverter 32. Additionally, the logic high signal on line 50 will cause transistor 34 to turn on, thereby coupling the output of inverter 32 to ground node 44 through the transistor 34. Thus, the input to inverter 40 will quickly transition from a logic high to a logic low signal, which will cause the output of inverter 40, and hence the output 56 of delay 30, to quickly transition from a logic low signal to a logic high signal.

Figure 3:
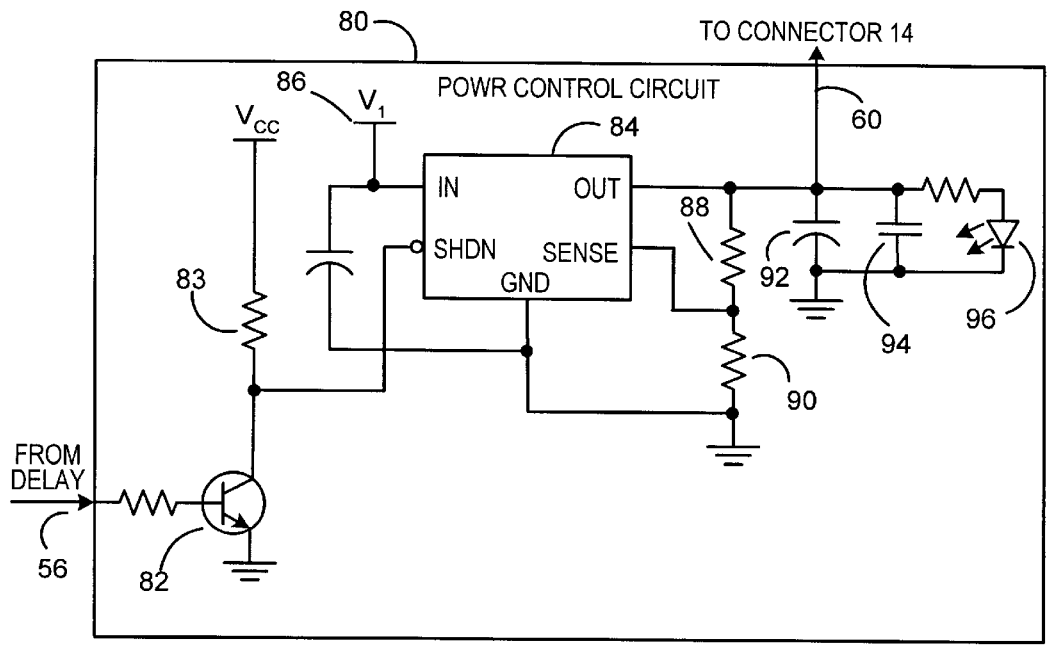
FIG. 3 illustrates in schematic diagram form a power control circuit for the docking system according to an embodiment of the present invention.

Referring now to FIG. 3, there is illustrated in schematic diagram form a power control circuit 80 according to one embodiment of the present invention. In this embodiment, power control circuit 80 is implemented utilizing a regulator circuit with an output enable line. The input signal from delay 30 on signal line 56 is input to a transistor 82, that operates to invert the signal level. The inverted signal is input to the shutdown terminal (SHDN) of a regulator 84. The logic state of the signal being input to the shutdown terminal of regulator 84 will control the enabling and disabling of the output of the regulator 84. As illustrated in FIG. 3, regulator 84 is preferably implemented as requiring a logic low signal to be input to the shutdown terminal to disable the output of the regulator 84. An input terminal (IN) of regulator 84 is coupled to a voltage source 86, having a value $V_1$. Thus, for example, $V_1$ may be provided on line 58 from power supply 18 (FIG. 1). Alternatively, $V_1$ may be provided by a different power supply within the mailing machine base 12. Voltage $V_1$ may or may not be equal to voltage $V_{cc}$. The output terminal (OUT) of regulator 84 is coupled to the output line 60 of power control circuit 80. A sense terminal (SENSE) of regulator 84 is coupled to a sensing circuit, including resistors 88, 90, to control regulation of the output voltage being output from the regulator 84. Preferably, the output voltage from the output terminal (OUT) of regulator 84 is regulated to 5 volts. Smoothing capacitors 92, 94 may be provided to ensure a stable output from the regulator 84. Optionally, a light emitting diode (LED) 96 can be provided to indicate when the output of regulator 84 is on, i.e., 5 volts.

When UIC 20 is not present, the signal on line 56 from delay 30 is a logic high signal. The logic high signal on line 56 will cause transistor 82 to turn on, thereby pulling the shutdown input of regulator 84 to ground, i.e., a logic low signal. As noted above, when the shutdown input to regulator 84 is a logic low signal, the output of the regulator 84 will be disabled, i.e., regulator 84 will not provide an output voltage on the output pin. Thus, the voltage level on line 60 will be 0 volts.

When UIC 20 is docked on the mailing machine base 12, i.e., connectors 24 and 14 are mated together, the logic level on signal line 56 will transition from high to low (after the predetermined delay as noted above). The logic low signal on line 56 will cause transistor 82 to turn off, thereby pulling the shutdown input of regulator 84 to $V_{cc}$ via resistor 83. When the shutdown input to regulator 84 is pulled up to $V_{cc}$, i.e., a logic high signal, the output of regulator 84 will be enabled and the input voltage $V_1$ will be regulated to the desired output voltage, such as, for example, 5 volts, and output on the output pin of the regulator 84. Thus, the voltage level on line 60 will be 5 volts, which will be input to the UIC 20 via connectors 14 and 24. When UIC 20 is removed from the mailing machine base 12, the signal on line 56 from delay 30 will quickly transition from a logic low signal to a logic high signal. The logic high signal on line 56 will cause transistor 82 to turn on, thereby pulling the shutdown input of regulator 84 to a logic low signal and disabling the output of the regulator 84. Thus, the voltage level on line 60 will return to 0 volts.

Figure 4:
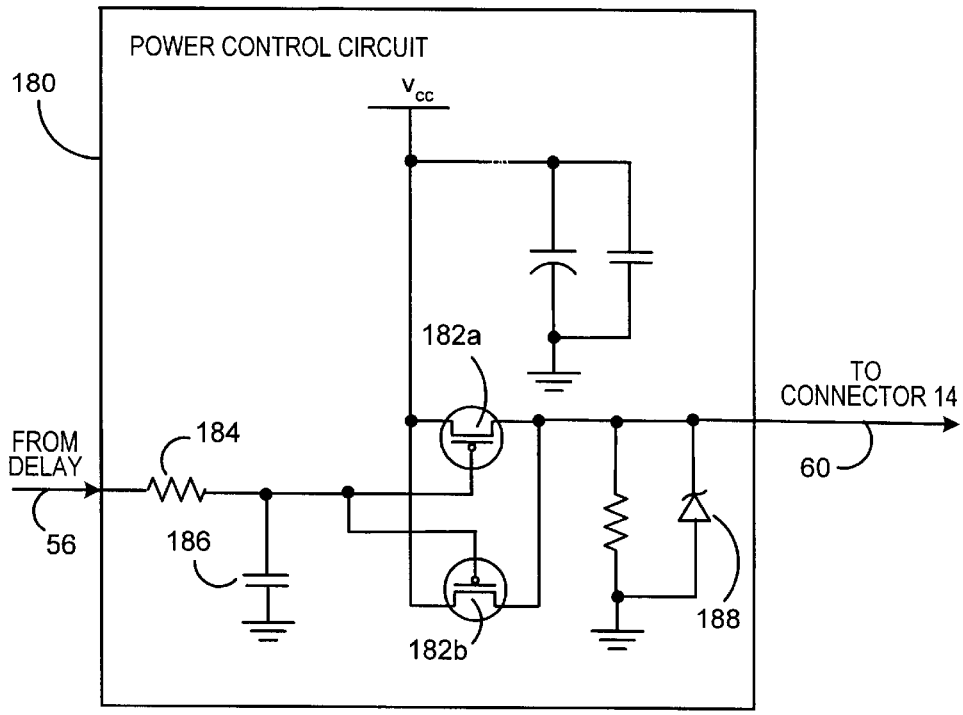
FIG. 4 illustrates in schematic diagram form a power control circuit for the docking system according to another embodiment of the present invention.

Referring now to FIG. 4, there is illustrated in schematic diagram form a power control circuit 180 according to another embodiment of the present invention. In this embodiment, power control circuit 180 is implemented utilizing a switch comprised of a parallel pair of p-channel MOSFET transistors 182a, 182b. It should be understood that while two transistors 182a, 182b are illustrated in FIG. 4, the invention is not so limited and any number of transistors may be utilized. The input signal from delay 30 on signal line 56 is input to the gate of each transistor 182a, 182b. Optionally, a resistor 184 and capacitor 186 may be provided between the input from delay 30 and the gates of the transistors 182a, 182b that will operate to slowly turn on the transistors 182a, 182b, thereby reducing any in-rush current to the UIC 20. The source and drain terminals of the transistors 182a, 182b are coupled between $V_{cc}$ and the output line 60 of the power control circuit 180. Optionally, a diode 188 may be provided between the output line 60 and ground to protect the circuit 180 from any inductive feedback caused by the circuitry or cabling of the UIC 20.

The operation of the circuit 180 is as follows. When UIC 20 is not present, the signal on line 56 from delay 30 is a logic high signal. The logic high signal on line 56 will cause transistors 182a, 182b to turn off. With transistors 182a, 182b off, the output line 60 will be at a logic low level, i.e., 0 volts. When UIC 20 is docked on the mailing machine base 12, i.e., connectors 24 and 14 are mated together, the logic level on signal line 56 will transition from high to low (after the predetermined delay as noted above). The logic low signal on line 56 will cause transistors 182a, 182b to turn on, thereby coupling the output line 60 to $V_{cc}$ via transistors, 182a, 182b. As noted above, the rate at which the transistors 182a, 182b are turned on can be controlled using resistor 184 and capacitor 186, thereby reducing any in-rush current passed through the transistors 182a, 182b. Thus, the voltage level on line 60 will be $V_{cc}$, e.g., 5 volts, which will be input to the UIC 20 via connectors 14 and 24. When UIC 20 is removed from the mailing machine base 12, the signal on line 56 from delay 30 will quickly transition from a logic low signal to a logic high signal. The logic high signal on line 56 will cause transistors 182a, 182b to turn off, thereby allowing the voltage level on line 60 to be pulled down to 0 volts.

Thus, according to the present invention, a mailing machine base 12 is provided with a UIC 20 that can be easily removed or installed without powering down the entire mailing machine base 12. Those skilled in the art will also recognize that various modifications can be made without departing from the spirit or scope of the present invention. For example, the delay 30 can be implemented in any number of hardware configurations, such as, for example, utilizing logic gates. As another example, the delay 30 could be implemented via software utilizing a microprocessor in the mailing machine base 12, or a combination of hardware and software.

It should be understood that although the present invention was described with respect to mailing machines, the present invention is not so limited and is applicable to any type of system having removable components in which it is desired to remove a component without having to power down the entire system. While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A mailing system comprising:
   a mailing machine base;
   a removable user interface for docking with the mailing machine base; and
   a docking circuit to couple a first supply voltage from the mailing machine base to the removable user interface when the removable user interface is docked with the mailing machine base, the docking circuit comprising:
   a delay having an input and an output; and
   a power control circuit coupled to the output of the delay,
   wherein when the removable user interface is docked with the mailing machine base, a first signal is provided to the input of the delay, and after a predetermined time period the delay provides a second signal on the delay output to the power control circuit, the power control circuit, in response to the second signal from the output of the delay, coupling the first supply voltage from the mailing machine base to the removable user interface.

2. The mailing system according to claim 1, wherein when the removable user interface is undocked from the mailing machine base, a third signal is provided to the input of the delay, the delay in response to the third signal providing a fourth signal on the delay output to the power control circuit, the power control circuit in response to the fourth signal uncoupling the first supply voltage from the removable user interface.

3. The mailing system according to claim 2, wherein the delay further comprises:
   an automatic reset to restart the predetermined time period each time the removable user interface cycles between a docked and undocked position.

4. The mailing system according to claim 3, wherein the delay further comprises:
   at least one capacitor,
   wherein the predetermined time period is based at least in part on a charging time of the at least one capacitor.

5. The mailing system according to claim 4, wherein the automatic reset is a transistor coupled across the at least one capacitor, the transistor in response to the third signal discharging the at least one capacitor.

6. The mailing system according to claim 2, wherein the power control circuit further comprises:
   a voltage regulator having a first input coupled to a second supply voltage, a second input coupled to the output of the delay, and an output to provide the first supply voltage,
   wherein the output of the voltage regulator is enabled in response to the second signal from the delay to couple the first supply voltage to the removable user interface and is disabled in response to the fourth signal from the delay to uncouple the first supply voltage from the removable user interface.

7. The mailing system according to claim 6, wherein the power control circuit further comprises:
   an inverter coupled between the output of the delay and the second input of the regulator to invert the second and fourth signals from the delay before inputting the second and fourth signals from the delay into the voltage regulator.

8. The mailing system according to claim 6, wherein the first supply voltage is different than the second supply voltage, and the regulator regulates the second supply voltage to the first supply voltage.

9. The mailing system according to claim 2, wherein the power control circuit further comprises:
   at least one transistor having a gate coupled to the output of the delay,
   wherein the at least one transistor, in response to the second signal from the output of the delay, couples the first supply voltage to the removable user interface and in response to the fourth signal uncouples the first supply voltage from the removable user interface.

10. The mailing system according to claim 2, wherein the first and second signals are logic low signals, and the third and fourth signals are logic high signals.

11. A removable user interface controller for a mailing machine comprising:
- a connector to mate with a corresponding docking connector of the mailing machine, said connector having a plurality of pins; and
- a bridging conductor to couple a first of the plurality of pins to a second of the plurality of pins, the bridging conductor conducting a first signal from the first pin to the second pin, the second pin providing the first signal to a first pin of said docking connector, the first pin of the docking connector providing the first signal to a delay circuit of the mailing machine, the delay circuit, in response to the first signal, sending a second signal to a power control circuit-after a predetermined time period, the power control circuit, in response to the second signal, coupling a supply voltage from the mailing machine to the docking connector.

12. A docking circuit for coupling a supply voltage from a machine to a removable user interface, the docking circuit comprising:
- a delay having an input and an output; and
- a power control circuit coupled to the output of the delay,
- wherein when the removable user interface is docked with the machine, a first signal is provided to the input of the delay, and after a predetermined time period the delay provides a second signal on the delay output to the power control circuit, the power control circuit, in response to the second signal from the output of the delay, coupling the supply voltage from the machine to the removable user interface.

13. The docking circuit according to claim 12, wherein when the removable user interface is undocked from the machine, a third signal is provided to the input of the delay, the delay in response to the third signal providing a fourth signal on the delay output to the power control circuit, the power control circuit in response to the fourth signal uncoupling the supply voltage from the removable user interface.

14. The docking circuit according to claim 13, wherein the delay further comprises:
- an automatic reset to restart the predetermined time period each time the removable user interface cycles between a docked and undocked position.

15. The docking circuit according to claim 14, wherein the delay further comprises:
- at least one capacitor,
- wherein the predetermined time period is based at least in part on a charging time of the at least one capacitor.

16. The docking circuit according to claim 15, wherein the automatic reset is a transistor coupled across the at least one capacitor, the transistor in response to the third signal discharging the at least one capacitor.

17. The docking circuit according to claim 13, wherein the power control circuit further comprises:
- a voltage regulator having a first input coupled to an input voltage, a second input coupled to the output of the delay, and an output to provide the power supply voltage,
- wherein the output of the voltage regulator is enabled in response to the second signal from the delay to couple the supply voltage to the removable user interface and is disabled in response to the fourth signal from the delay to uncouple the supply voltage from the removable user interface.

18. The docking circuit according to claim 17, wherein the power control circuit further comprises:
- an inverter coupled between the output of the delay and the second input of the regulator to invert the second and fourth signals from the delay before inputting the second and fourth signals from the delay into the voltage regulator.

19. The docking circuit according to claim 17, wherein the supply voltage is different than the input voltage, and the regulator regulates the input voltage to the supply voltage.

20. The docking circuit according to claim 13, wherein the power control circuit further comprises:
- at least one transistor having a gate coupled to the output of the delay,
- wherein the at least one transistor, in response to the second signal from the output of the delay, couples the supply voltage to the removable user interface and in response to the fourth signal uncouples the supply voltage from the removable user interface.

21. The docking circuit according to claim 12, wherein the machine is a mailing machine.

22. A method for providing a first supply voltage from a mailing machine base to a removable user interface, the method comprising:
- docking the removable user interface with the mailing machine base;
- providing a first signal to a delay circuit in response to the docking;
- providing a second signal from the delay circuit to a power control circuit after a predetermined time period associated with the delay circuit; and
- coupling, by the power control circuit, the first supply voltage from the mailing machine base to the removable user interface in response to the second signal from the output of the delay.

23. The method according to claim 22, further comprising:
- undocking the removable user interface from the mailing machine base;
- providing a third signal the delay circuit, the delay circuit in response to the third signal providing a fourth signal to the power control circuit; and
- uncoupling, by the power control circuit, the first supply voltage from the removable user interface in response to the fourth signal.

24. The method according to claim 23, wherein providing a second signal from the delay circuit further comprises:
- restarting the predetermined time period each time the removable user interface cycles between a docked and undocked position.

25. The method according to claim 24, wherein providing a second signal from the delay circuit further comprises:
- waiting for at least one capacitor to charge before providing the second signal from the delay circuit.

26. The method according to claim 25, wherein restarting further comprises:
- discharging the at least one capacitor.

27. The method according to claim 23, coupling, by the power control circuit, the first supply voltage from the mailing machine base to the removable user interface further comprises:
- enabling an output of a voltage regulator in response to the second signal from the delay to couple the first supply voltage to the removable user interface.

28. The method according to claim 27, wherein uncoupling, by the power control circuit, the first supply voltage from the removable user interface further comprises:
   disabling the output of the voltage regulator in response to the fourth signal from the delay to uncouple the first supply voltage from the removable user interface.

29. The method according to claim 28, coupling and uncoupling the first supply voltage from the mailing machine base to the removable user interface further comprises:
   inverting the second and fourth signals, respectively, from the delay; and
   inputting the inverted second and fourth signals into the voltage regulator.

30. The method according to claim 23, wherein coupling, by the power control circuit, the first supply voltage from the mailing machine base to the removable user interface further comprises:
   turning on a transistor in response to the second signal from the output of the delay to couple the first supply voltage to the removable user interface.

31. The method according to claim 30, wherein uncoupling, by the power control circuit, the first supply voltage from the removable user interface further comprises:
   turning off the transistor in response to the fourth signal to uncouple the first supply voltage from the removable user interface.

* * * * *